United States Patent [19]

Willits et al.

[11] 3,743,820

[45] July 3, 1973

[54] RANDOM ORIENTED DECODER FOR LABEL DECODING

[75] Inventors: Samuel P. Willits; William L. Mohan, both of Barrington, Ill.

[73] Assignee: Spartanics, Ltd., Patatine Village, Cook County, Ill.

[22] Filed: Feb. 14, 1972

[21] Appl. No.: 225,840

Related U.S. Application Data

[63] Continuation-in-part of Ser. No. 806,371, March 12, 1969, Pat. No. 3,643,063.

[52] U.S. Cl.235/61.11 E, 340/146.1, 340/146.3 AG

[51] Int. Cl. .............................................. G06r 7/00

[58] Field of Search ......... 340/146.1 BA, 146.1 BE, 340/146.3 ED, 146.3 D, 146.3 Q, 146.3 AG; 235/61.11 E, 61.7 R; 178/23 A

[56] References Cited

UNITED STATES PATENTS

| | | | |
|---|---|---|---|
| 3,600,556 | 8/1971 | Acker | 235/61.11 E |
| 3,366,926 | 1/1968 | Silsby et al. | 340/146.3 D |
| 2,989,890 | 6/1961 | Dressler | 340/146.3 Q |

*Primary Examiner*—Thomas A. Robinson
*Attorney*—Jacque L. Meister

[57] ABSTRACT

A rotary scanning decoder for reading labels having binary data bits each of which comprises a pair of contrasting areas, the ratio of areas in each bit defining the bits' binary status. The position of the label relative to the decoder is not critical so long as substantially all of the label is seen by the decoder. Means are provided for eliminating ambiguities due to mutilation or foreign material on the label.

11 Claims, 10 Drawing Figures

Patented July 3, 1973 3,743,820

5 Sheets-Sheet 4

RANDOM ORIENTED DECODER FOR LABEL DECODING

REFERENCES TO RELATED APPLICATIONS

This application is a continuation-in-part of the application of William L. Mohan and Samuel P. Willits, Ser. No. 806,371, filed Mar. 12, 1969, titled RANDOM ORIENTED DECODER FOR LABEL DECODING, now U.S. Pat. No. 3,643,068, issued Feb. 15, 1972.

BACKGROUND OF THE INVENTION

The field of the invention is generally related to label decoding and more particularly to the decoding of binary coded data arranged on the label either as a series of concentric annular bands of alternating contrast or series of spoke-like alternating contrast areas radiating from a center.

In the aforementioned Mohan et al. application, there is described apparatus for decoding plural binary coded data bits consisting of alternating contrast areas. In particular, several forms of such binary coded labels are shown and described as well as label scanning and signal processing circuits to effect decoding of the labels.

While the apparatus of the parent Mohan application solved many problems and in most instances provided an excellent method for coding and decoding binary coded labels, where the label was smudged or soiled or partially mutilated, it was possible to obtain incorrect readouts of the damaged data bits. When one considers that the coded label is most often affixed to retail merchandise including foodstuffs, the possibility of such damage to a label is apparent.

SUMMARY OF THE INVENTION

It is accordingly a principal object of the invention to obtain correct readouts of labels of the type shown in the parent application but that have been damaged or the coded data partially obliterated. This object is achieved by providing, either actually or effectively, a plurality of sensors, whose collective image is caused to scan across the label in a generally circular path. The output of each of these several sensors, after processing, including self-validation, is proven correct or validated against the similarly processed data output of the other sensors by multi-parallel data units.

DESCRIPTION OF THE PREFERRED EMBODIMENTS

Figure 1:
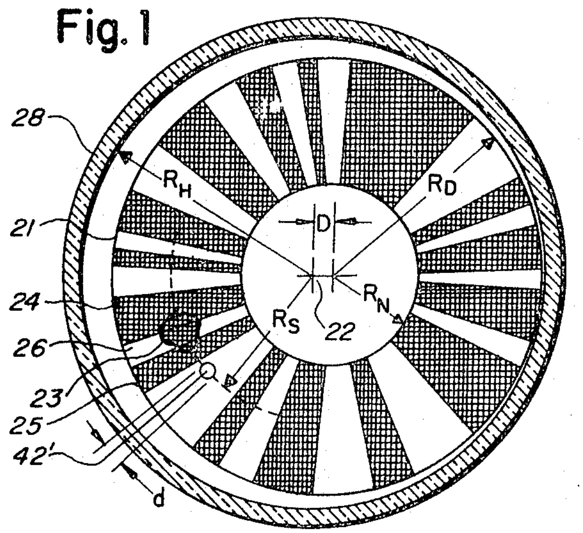
FIG. 1 is a plan view of a label of the invention with one data bit partially obscured.

FIG. 1 illustrates relationships between a label 21, the transparent housing 28 of a scanner probe and the image 42' of the scanning sensor 42. The scanner probe itself is not shown in detail in this description, it having been described in connection with the parent application. The sensor image 42' has an apparent diameter "*d*" and follows a generally circular path at a radius $R_s$ about the center axis 22 of the scanner probe. The scanner probe housing has a radius of $R_h$ and the maximum and minimum radius of the contrasting segments of the label are $R_d$ and $R_n$, respectively. The label and housing axes are shown as misaligned by a distance D.

Figure 2:
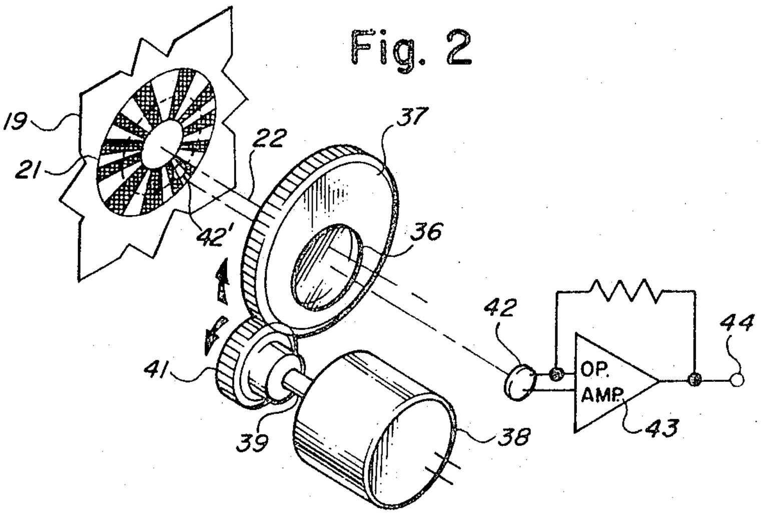
FIG. 2 is an exploded view of a scanning system useful with the invention.

The image 42' of the sensor 42 is nutated to produce a circular scan by the scanning system shown in exploded and somewhat schematic view in FIG. 2. In this view much of the scanner structure and the transparent housing are not shown to clarify the representation of the active scanning elements. A lens 36 is mounted in rotatable carrier 37, offset from the center axis 22 of the scanner probe. The carrier 37 is driven by a motor 38 which has an output shaft 39 carrying a pinion gear 41 which engages the teeth of the external ring gear formed in the edge of the carrier. Sensor 42 is imaged by lens 36 upon the label 21 where the circular path of the image 42' is shown by a dotted line. The electrical output of sensor 42 corresponding to the alternating contrast areas of the spokes in label 21 are amplified in an operational amplifier 43 and supplied to output terminal 44.

As the sensor image 42' traverses the label 21 in its scan, it crosses a soiled spot 23. As shown, spot 23 is a dark area whose contrast characteristics are substantially the same as those of the areas 24 and 25 adjacent it. Since the soiled spot 23 is large compared to the diameter *d* of the sensor image 42, the sensor "sees" an elongated dark contrast area whose angular extent is that of segments 24, 25, and 26. As is readily apparent, this will generate an erroneous binary data bit. It is a feature of the invention that such errors caused by dirt or mutilation of the label, are largely overcome by the novel combination of plural sensors and validating circuitry of the invention.

Figure 3:
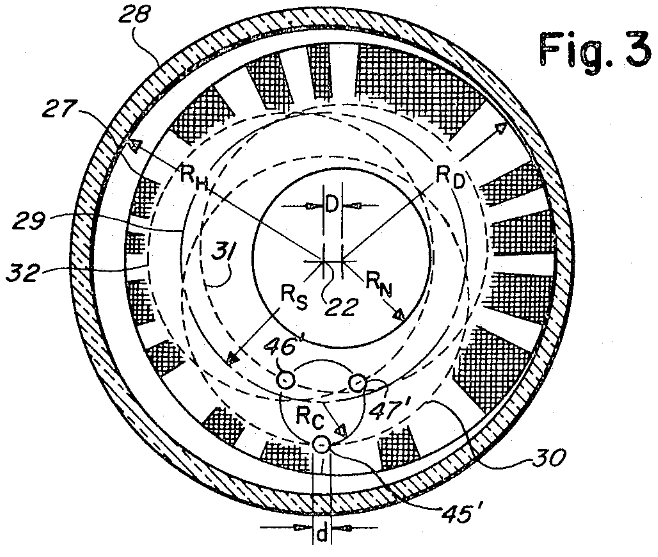
FIG. 3 is a partial plan view of a label of the invention showing the paths of the images of three nutating sensors as they scan the label.

FIG. 3 is a partial plan view of a label of the invention and of the scanner probe housing. The label is only shown in part to reduce drawing clutter and clarify the presentation of sensors travel. It should be understood that in all essential manners the label 27 of FIG. 3 is identical to that of label 21 in FIG. 1. The various radii $R_d$, $R_n$, $R_s$, and $R_h$ and offset D all have identical meanings to those described above.

As suggested above, the inventors have discovered that a combination of plural sensors and novel validating circuitry will reduce and tend to eliminate errors due to label mutilations. FIG. 3 illustrates the relationships between the images of such a plural sensor arrangement, the label being scanned and the transparent housing of the sensor probe. In FIG. 3, the image of a single nutating circular scanning sensor of FIG. 1 has been replaced with the images 45', 46', and 47' of three sensors. As shown, the images of the group of three sensors is nutated in a circular path similar to that for the single sensor of FIG. 1. Here however $R_s$ defines the scan radius to the center of the group of three images and $R_c$ defines the radius of the circle about the end of the scan radius upon which the sensor images are equally spaced. The dashed line 29 shows the path of the center of the array and is defined by $R_s$. Dashed line 30 represents the path of sensor image 45' while lines 31 and 32 represent the paths of sensor images 46' and 47', respectively.

An examination of the path of the three nutating, circular scanning sensor images shows that all three paths are within the confine of the label coded area, and that these paths are unlikely to all cross a single small mutilated label area. To eliminate errors due to such mutilation, the invention compares the outputs of all three sensors and, as the output of a validation circuit described below, presents as a single output the data that is identical for at least two sensors.

As the quantity of sensors is increased to enable data validation, the requirements for accurate location of the sensor images are also increased. Assuming the center uncoded area of the label is one-third of the label diameter and that the housing of the probe is 15 percent larger in diameter than that of the label to permit easy operator location of the label, then the maximum misalignment between label and housing (D max) is $.15R_d$. If $R_c$ is equal to D max. then:

$$R_s = [R_d + 2D + d]/2$$

This equation will hold no matter now many sensors are used if the other relationships remain the same. The scanning system shown in FIG. 4 complies with this requirement and achieves the scan requirements for a three sensor array. The components of FIG. 4, other than sensors and their associated electrical outputs are the same as those of FIG. 2. The three sensors 45, 46 and 47 are shown mounted on a common substrate 48. Each sensor has associated therewith an operational amplifier with its output terminal; sensor 47 is associated with amplifier 49 and terminal 52, sensor 46 with amplifier 50 and terminal 53 and sensor 45 with amplifier 51 and terminal 54.

The foregoing description of a three sensor system is simple and serves to describe a basic multi-sensor scanning system. However, an examination of scan paths 30, 31 and 32 reveals that they are in close enough proximity at one or more points to create the possibility of a single mutilated label area affecting the output of two or even all three sensors. As a result, it has been found that it is desirable and advantageous in a nutating scanning system to employ more than three sensors in the preferred embodiment of the invention and one such sensor configuration is shown and described in connection with FIGS. 5 and 6.

Figures 4, 5:
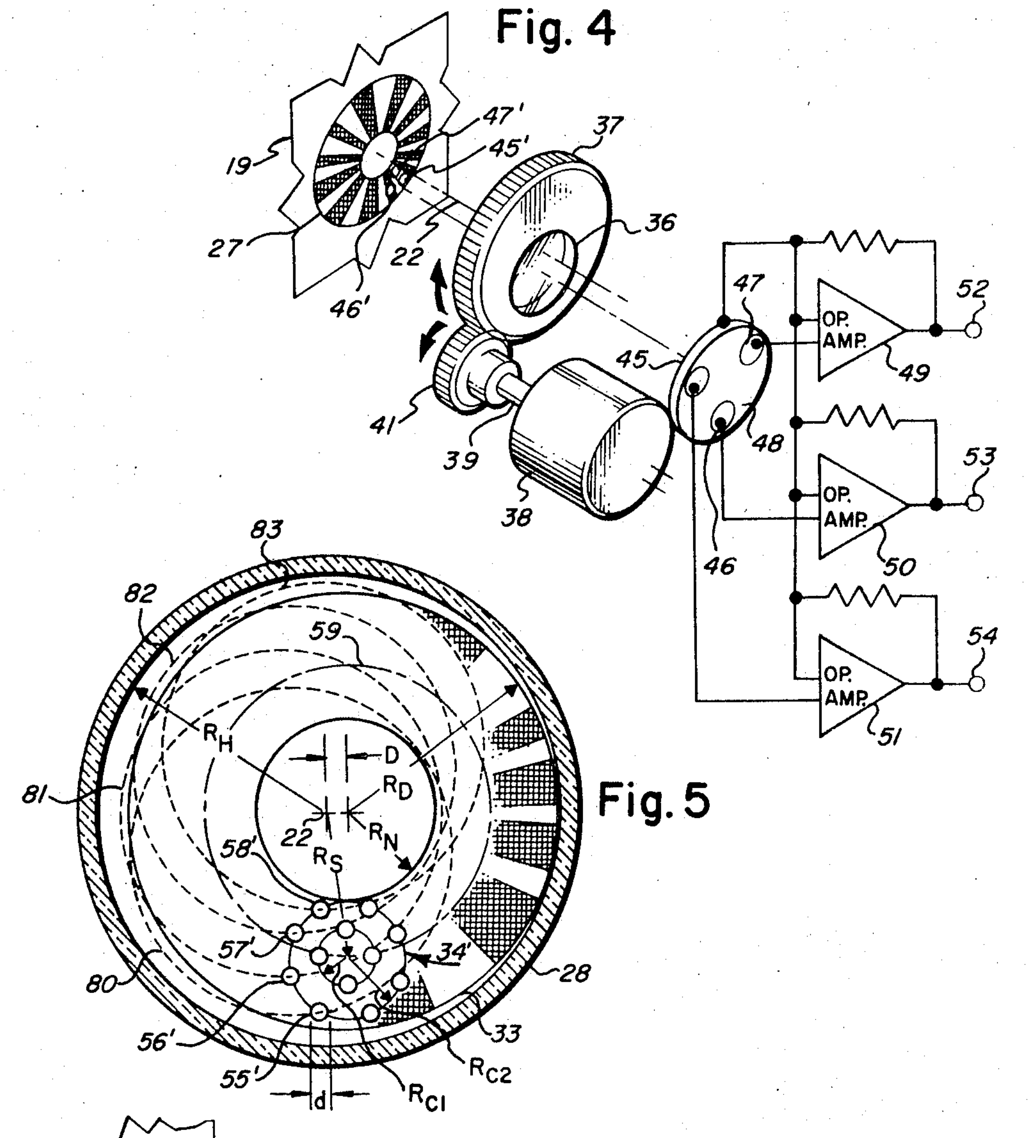
FIG. 4 is an exploded view of a scanning system identical to that of FIG. 2 except that three sensors are employed.
FIG. 5 is a partial plan view of a label of the invention showing the paths of the images of four nutating sensors of a group of twelve that are scanning the label.
Figure 6:
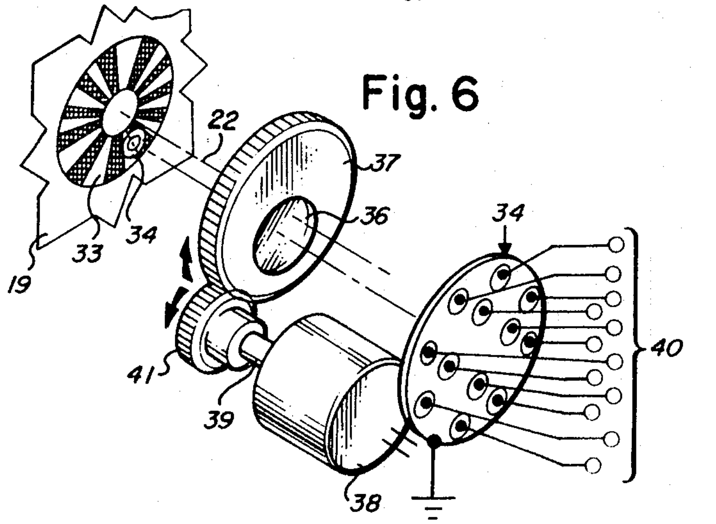
FIG. 6 is an exploded view of a scanning system identical to that of FIG. 4 except that twelve sensors are employed.

FIGS. 5 and 6 are similar to FIGS. 3 and 4, the differences being that in FIGS. 5 and 6 there are 12 sensors and sensor images arranged in two concentric rings with four sensors in the inner ring. The inner circle of sensors has a radius $R_{c1}$ about the end of the scan radius and the outer ring has a radius $R_{c2}$ about the same center. As shown $R_{c1} = D$ and $Rc2 = 2D$. To avoid the confusion of proliferating leads lines and reference numerals, the entire sensor array has been generally designated as 34 and its image as 34'. In FIG. 6 the output terminals of array 34 are collectively designated as 40.

In FIG. 5, the image 34' of the nutating circularly scanning sensor array is such that the images 55'–58' of four of its sensors 55–58, pass outside the outer diameter of the label 33 during a portion of the scan cycle. The path of the image 34' of the center of array 34 is shown by dashed line 59. The paths of the four sensor images 55'–58' that pass outside the label outer diameter are shown at 80–83, respectively. Since the sensors 55–58 do not see all the contrast spokes of the label 33, the output data of these sensors obviously is not valid. Since the 15 percent misalignment of scanner and label shown alone will cause invalid data in four sensors, valid data under these conditions can be obtained from at most eight senors. As a practical matter, in one system embodiment validity is determined by comparing all sensor data and presenting as a single output the data that is identical for at least 5 sensors.

While it is easy to contemplate a simple criteria for determining which sensor outputs are valid, such as the majority rule for identity determination used in the embodiments described above, it may be both desirable and necessary to employ other criteria in place of or as a supplement to such a rule. One such system that has proven useful determines if the preselected required majority of identical output data is present but checks the data not the same as the majority to determine if it is also identical. If it is, there is a likelihood that either all data is invalid because of the decoder system or of an unusual label error that suggests label alteration. In such an instance a signal is generated that informs the operator of the likelihood of error. In still other systems, recognition is given to the location of intersections of scan paths. In such a system the data for sensors whose paths intersect are compared as a group to other similar groups. The invention is not in any way limited to use of any single type of criteria for determining output data validity, it being the intent to establish the criteria and implement it in a data validation circuit tailored to the needs of the particular decoding system.

Figure 7:
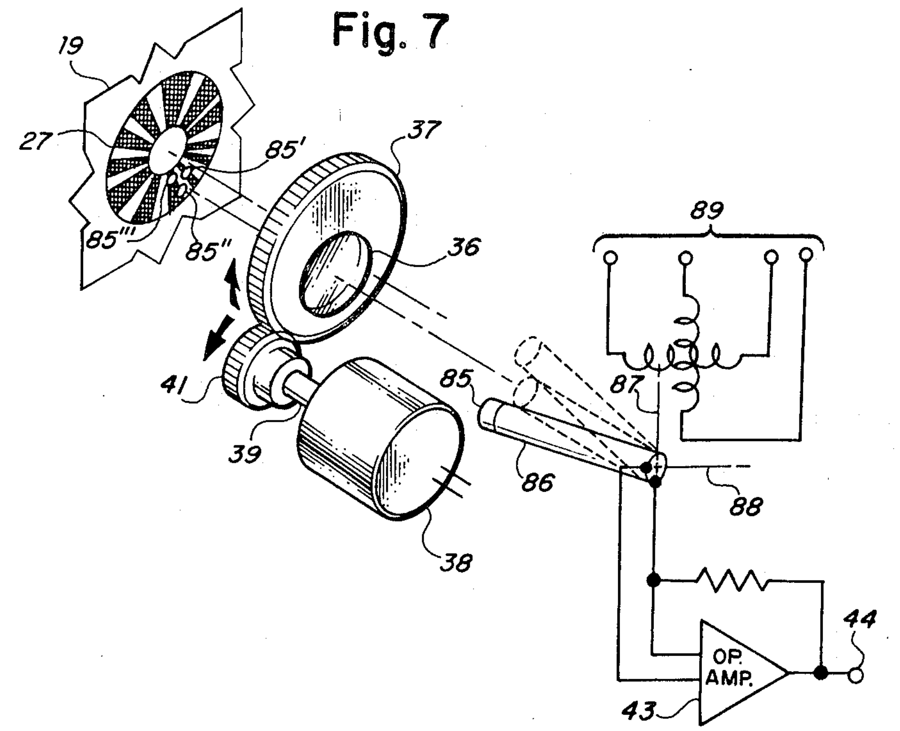
FIG. 7 is an exploded view of a scanning system similar to that of FIG. 4 but employing a single sensor to achieve the effect of three.

FIG. 7 illustrates in schematic form a system for programing a single sensor so that its serially generated data is the equivalent of that of a multi-sensor array. Here sensor 85 is affixed to a two axis movable wand 86. The position of wand 86 is changed to a programed location between each scan cycle upon the command signal provided by the start data bit to conform to the desired scan geometry. The wand is shown as located in three different positions to effectively duplicate the scan geometry of FIGS. 3 and 4. The wand is displaced about axes 87 and 88 by a two axis scan motor drive 89. While the scanning system shown in FIG. 7 nutates and rotates the sensor image in the same manner as shown in FIGS. 2, 4 and 6, it is apparent that suitable programing of scan motor drive 89 will permit a construction without any of the mechanical scanning elements driven by motor 38 other than an imaging element. Validation of the serially generated data is accomplished in the same manner as for the parallel generated data of FIG. 4, the only difference being the sequential gating of the serial data into the proper word storage unit corresponding to the sequential programmed positions of the sensor and wand.

As the description and FIG. 7 show, one sensor can be used to generate data that can be substituted for that of three sensors. However, there is no upper limit on the number of sensors data that can be generated by a single sensor other than those imposed by circuit or mechanical limitations. Thus, wherever a single sensor is used, it can be the effective equivalent of a large number of sensors.

Figure 9:
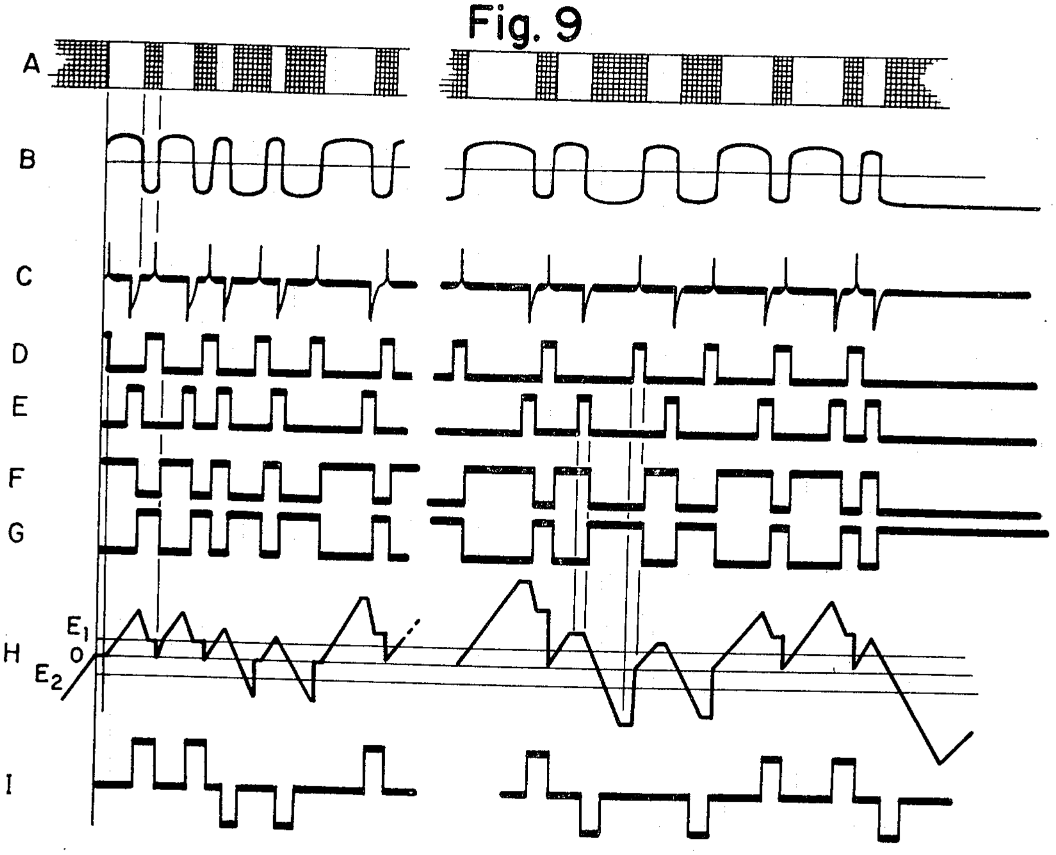
FIGS. 9A–9I are illustrative of waveforms present in various parts of the circuitry of FIG. 8.
Figure 8:
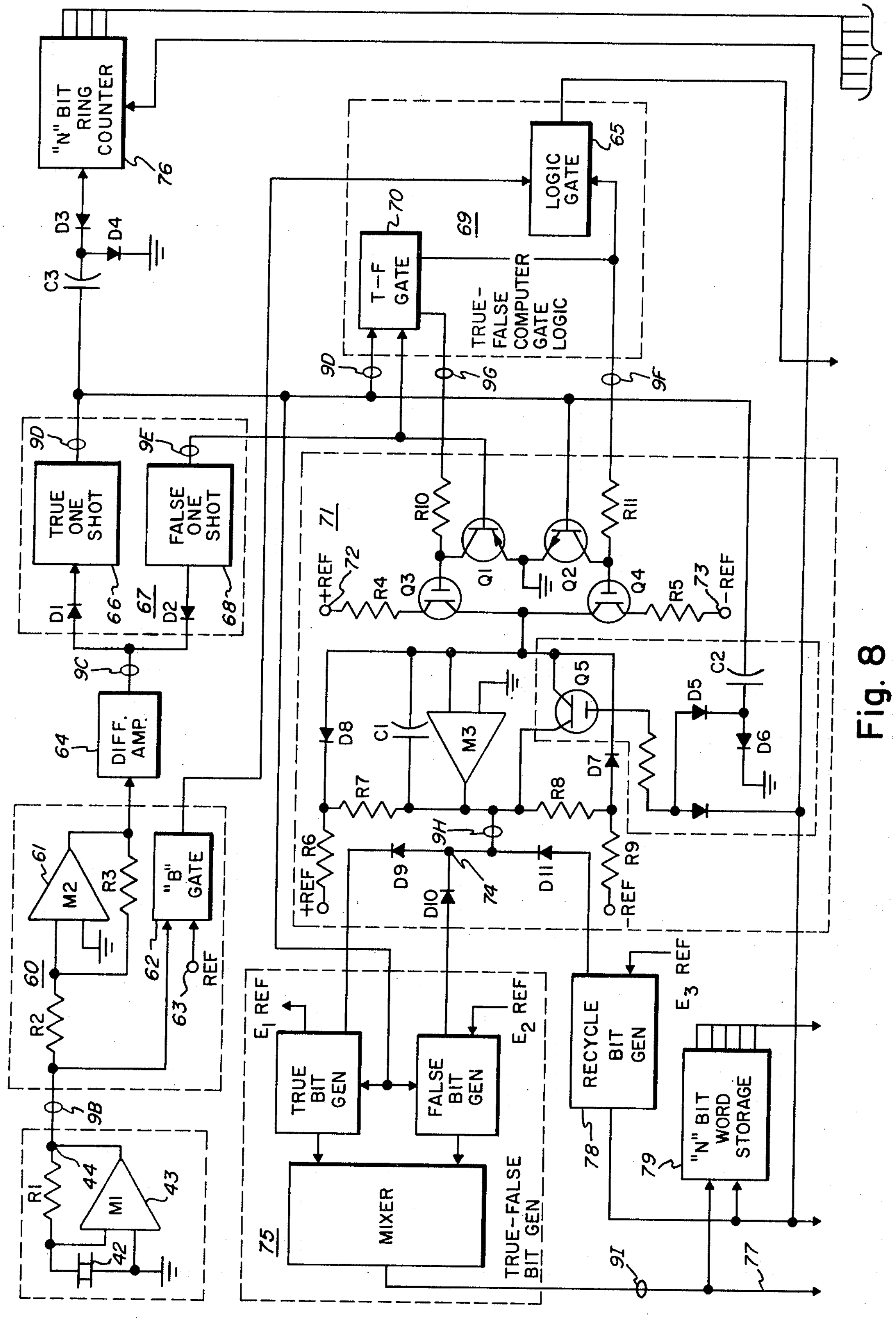
FIG. 8 is an electrical schematic, partially in block diagram form, of a circuit used for decoding the binary bits of a label similar to that illustrated in FIG. 1.

FIG. 8 illustrates in schematic and partially in block diagram form a circuit used for decoding and internally validating the binary bits of data generated by a single sensor as it scans a label of the type shown in FIG. 1. The FIG. 8 circuit is substantially identical to that shown in FIG. 9 of the parent application where its operation is described in detail. The circuit is useful for decoding the output of each sensor of this apparatus. FIG. 9A is a linear representation corresponding to the alternating contrast areas comprising the binary data bits of the label 21. FIGS. 9B through 9I illustrate waveforms present at the correspondingly lettered portion of FIG. 8. The output of a sensor 42 is amplified in preamplifier 43 and applied to terminal 44 at the input of the FIG. 8 decoding circuit. The amplified sensor output wave form is shown in FIG. 9B and corresponds to the optical contrast gradients encountered as the sensor sequentially scans the binary bits. Time increases from left to right in FIG. 9.

The 9B signal is further amplified in amplifier 60. Amplifier 60 comprises an operational amplifier 61 and a brightness logic gate 62. Logic gate 62 determines if the 9B signal corresponds to a minimum brightness validity level which is defined by a reference voltage applied at terminal 63. The output of brightness logic gate 62 is applied to true-false-computer-gate logic circuit 69, whose operation is explained subsequently.

The output of amplifier 61 is supplied to an AC differential amplifier 64 which forms the output wave form shown in FIG. 9C. The positive going spikes in the FIG. 9C wavetrain are used to trigger on a "True" one-shot multivibrator 66 and the negative going spikes trigger the "False" one-shot multivibrator 68. The outputs of these two multivibrators are shown in FIGS. 9D and 9E, respectively, and are used as gates at several places in the remainder of the circuit. The time duration of each of the one-shot gate pulses is very short compared to the minimum interval of a single cycle of the FIG. 9B wavetrain and is on the order of 5 percent or less of that interval.

The FIG. 9D gate pulses are applied to true-false gate 70 where their leading edges are used to generate the start of the "true" gate of true-false computer gate logic circuit 69. The FIG. 9E gate pulses are also applied to true-false gate 70 where their leading edges are used to generate the start of the "false" gate. The output of the true-false gate logic 70 is shown in FIG. 9, the "true" gate being shown at 9F and the "false" gate at 9G. If the bit data corresponding to the "true" gate pulses 9F was generated when the output of brightness gate 62 indicated sufficient contrast to insure data validity, the output of logic gate 65 is inhibited and the 9F and 9G gate pulse wavetrains are used to operate the bit analog computer 71.

As described in the parent application, scanning of the type here employed generates a frequency modulated, phase modulated signal wavetrain. To insure against ambiguities in the binary bit data and to provide additional bit validation, the determination of whether a bit is "true" or "false" or ambiguous is made on a cycle-by-cycle basis depending on the ratio of contrast areas in a "bit" cycle. Analog computer 71 has a fixed constant of integration which is a fixed rate of change of voltage with respect to time as defined by equal plus ( + ) and minus ( − ) voltage references applied to terminals 72 and 73, respectively. Then, the polarity of the output signal in the wavetrain of FIG. 9H which appears at output terminal 74, is determined only in accord with the ratio of the gate time that ties the computer input first to the "minus" reference through resistor R5 and transistor Q4 because of "true" gate 9F and then to the "plus" reference through resistor R4 and transistor Q3 because of "false" gate 9G. Details of the manner of operation of the bit analog computer 71 under the influence of wavetrains 9D, 9E, 9F and 9G were explained in the parent application and reference to that application should be made if its operation is not apparent from this shortened description. Further, a description of the internal validation system that checks for invalid ratios of a bit's contrast areas or the manner in which N bit ring counter 76 validates the total number of bits per scan cycle are described in the parent application.

The FIG. 9H wavetrain at the output of the bit analog computer is applied to a "true false bit generator" 75, where it is reshaped into a wavetrain more suitable for subsequent processing in digital circuits. The shaped wavetrain is shown at FIG. 9I. This train of true-false bits, having a polarity of either plus ( + ) or minus ( − ) for 1 or 0, binary data, is sequentially fed to a computer via line 77 and/or an N bit word storage unit 79 where it is stored for use in the multiparallel data validation circuit of FIG. 10.

Figure 10:
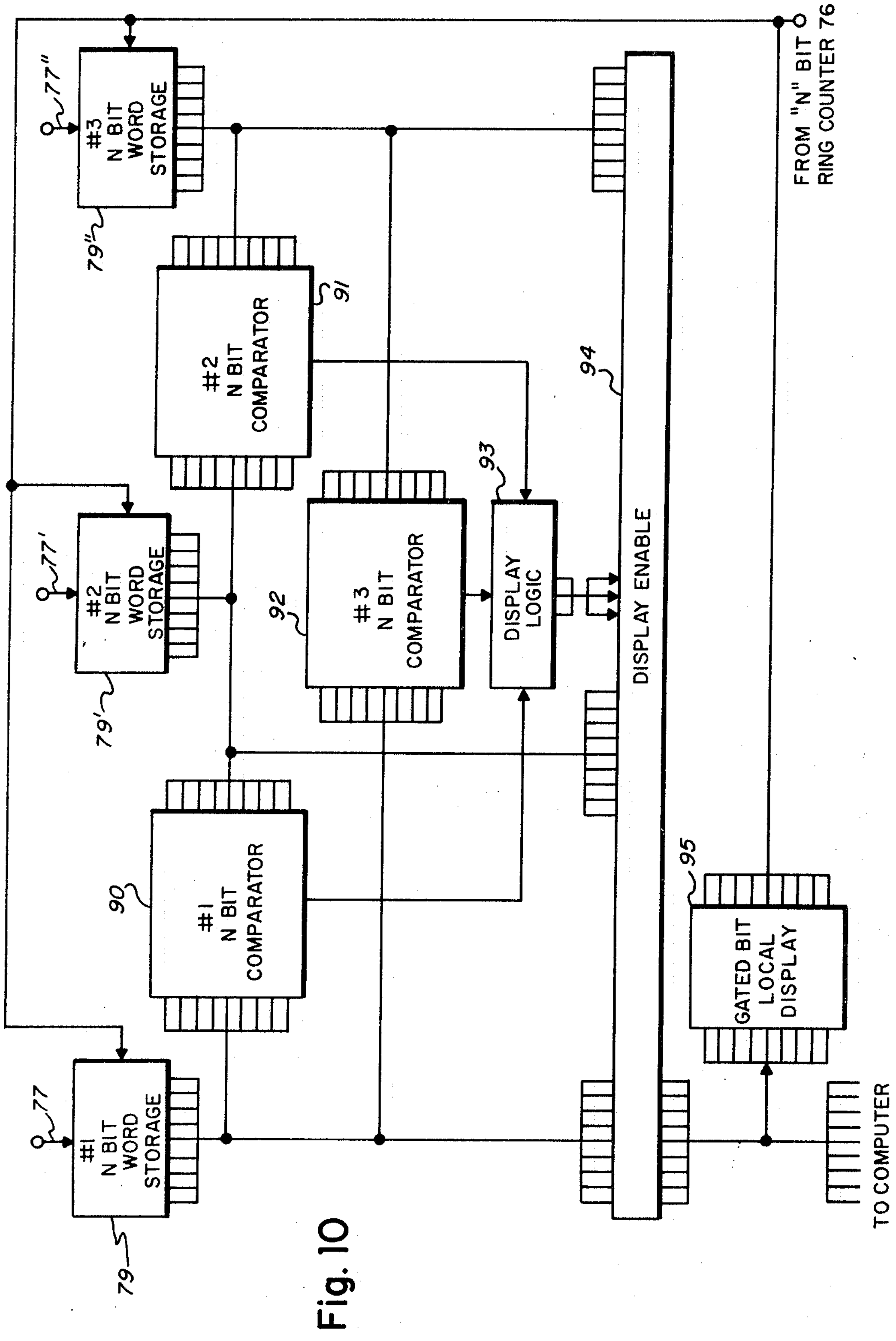
FIG. 10 is a schematic in block diagram form of a circuit used to achieve multi-parallel data validation.

Data validation to determine if one or more sensors have generated invalid output word data is performed in parallel in a circuit such as that of FIG. 10. The FIG. 10 validation circuit is that for a three sensor scanning system such as that shown in FIG. 4. The criteria for the FIG. 10 circuit is that two of the output words must be identical in order to be displayed or passed to a computer. However, as pointed out above, it is to be understood that the principles of validation here described can be extended to cover any number of sensors and that the criteria for determining if their output data is valid can also be varied.

Each sensor of the decoding system has associated with its output, signal processing circuitry of the type shown and described in connection with FIG. 8. The output of each of these circuits is applied via a line 77 to an N bit word storage unit. In the FIG. 10 validation circuit for three sensors employing a simple majority rule criteria for determining validity, there are three N bit word storage units designated #1, #2 and #3 and identified with reference numerals 79, 79′ and 79″, respectively. When a complete word is stored in all three word storage units, N bit ring counter 76 of FIG. 8, gates out the stored words to N bit comparators; #1 N bit comparator 90 receives and compares the stored word output of the #1 and #2 N bit word storage units; #2 N bit comparator 91 receives and compares the stored word output of the #2 and #3 N bit word storage units and the #3 N bit comparator 92 receives and compares the stored word output of the #1 and #3 N bit word storage units.

Each of the N bit word comparators generates an output gate pulse if the N bit words it is comparing are identical. These output gate pulses are applied to display logic circuit 93 which, in turn selects for display the N bit word that has been validated and generates a gate pulse corresponding thereto. The display logic output gate switches the validated N bit word to gated bit local display unit 95 which displays the word upon signal from the N bit ring counter 76. The circuit details of the block elements of FIGS. 8 and 10 are all well known and since they form no part of the invention are not shown here.

The foregoing description of a multi-sensor data validation circuit has been for use with three sensors having a particular validity criteria. As is apparent, however, the same circuit can function effectively for serial word validation such as is necessary for the sensor configuration of FIG. 7. In such an instance, all that need be added is a sequential switching system under the control of the scanner position programing unit to sequentially gate the outputs of sensor 85 to the appropriate N bit word storage unit 79 of the FIG. 10 valida-tion circuit. Further, extension of the FIG. 10 circuit for use with a larger quantity of sensors is easily achieved using the invention principles, it being the intent to describe an uncomplex validation circuit to thereby simplify this description.

The invention has been described in detail herein with particular reference to preferred embodiments thereof. In particular, the descriptions of plural sensor scan were in terms of nutating sensor images in a circular path. However, it should be understood that any scanning system that achieves generally circular multiple-scan paths about the label center, with or without nutation, is useful. For some of many such scanning systems that provide a useful scan pattern, refer to FIGS. 4, 5, 12, 13, 21, 26, and 34 of the parent application.

Further, in all of the inventive embodiments described, the scanning of the label has been by one or more sensors. However, the same results can be achieved by scanning of the label with one or plural radiation sources which are viewed by stationary sensors. Thus, it is apparent that sensors and radiation sources can be interchanged with equivalent results. Further, it should be understood that these and other modifications and variations can be effected within the spirit and scope of the invention as described herein and as defined in the appended claims.

We claim:

1. Improved means for detecting and decoding information on a circularly coded label having a single channel of information arranged in the form of an annular area consisting of a start code bit and N data bits comprising an N bit word, each data bit comprising a pair of alternating contrast areas, comprising a plurality of sensor means imaging means interposed between said label and said plural sensor means for imaging said sensor means on said label scanning means for the collective image of said plural sensor means to provide a nutating scan with respect to said single information channel annular area of said label thereby to generate a frequency modulated phase modulated output signal wavetrain from each of said sensor means, each cycle of said wavetrain being representative of a data bit, plural decoding and data bit validity checking means, one for each of said sensor means, connected and responsive to the output of its associated sensor means to decode said output signals by converting them to N bit word information, and data validation circuit means comprising comparison means connected to each of said decoding means to receive and compare said N bit word information from each of said decoding means and gate out for use or display said N bit word determined to be true by the selected circuit validity criteria.

2. Improved means for detecting and decoding information on a circularly coded label having a single channel of information arranged in the form of an annular area consisting of a start code bit and N data bits comprising an N bit word, each data bit comprising a pair of alternating contrast areas, comprising a plurality of sensor means, imaging means interposed between said label and said plural sensor means for imaging said sensor means on said label, scanning means for the collective image of said plural sensor means to provide a nutating scan with respect to said single information channel annular area of said label thereby to generate a frequency modulated, phase modulated output signal wavetrain from each of said sensor means, each cycle of said wavetrain being representative of a data bit, plural decoding and data bit checking means, one for each of said sensor means, connected and responsive to the output of its associated sensor means to decode said output signals by converting them to N bit word information.

plural N bit word storage unit means, one for each of said decoding means and connected to receive and store said N bit word information, and data validation circuit means comprising comparison means connected to said plural N bit word storage unit means and adapted to compare said N bit word information stored therein and gate out for use or display that N bit word determined to be true by the selected circuit validity criteria 3. Improved means for detecting and decoding information on a circularly coded label having a single channel of information arranged in the form of an annular area consisting of a start code bit and N data bits comprising an N bit word, each data bit comprising a pair of alternating contrast areas, comprising a plurality of sensor means, imaging means interposed between said label and said plural sensor means for imaging said sensor means on said label, scanning means for nutating the collective image of said plural sensor means to provide a circular scan with respect to said single information channel annular area of said label thereby to generate a frequency modulated, phase modulated output signal wavetrain from each of said sensor means, each cycle of said wavetrain being representative of a data bit plural decoding means, one for each of said sensor means, connected and responsive to the output of its associated sensor means to decode said output signals by converting them to N bit word information, said decoding means being further adapted to validate said output signal wavetrain for label brightness, con-trast area relative angular extent and total number of bits in the label, plural N bit word storage unit means, one for each of said decoding means and connected to receive and store said N bit word information, and data validation circuit means comprising comparison means connected to said plural N bit word storage unit means and adapted to compare said N bit word information stored therein and gate out for use or display that N bit word determined to be true by the selected circuit validity criteria.

4. Improved means for detecting and decoding information on a circularly coded label having a single channel of information arranged in the form of an annular area consisting of a start code bit and N data bits comprising an N bit word, each data bit comprising a pair of alternating contrast areas, comprising sensor means, imaging means interposed between said sensor means said label for imaging said sensor means on said label, scanning means for the image of said sensor means to provide a substantially circular scan of said image upon said single information channel annular area of said label thereby to generate a sequence of frequency modulated phase modulated output signal wavetrains N bits long interrupted by said start code bits and representative of said N bit word, two axis scan motor drive means adapted to sequentially relocate said sensor means to a programmed start location during the time domain of each start code bit, plural decoding and data bit validity checking means connected and responsive to said output signal wavetrain to decode the information therein by conversion to one N bit word for each programmed location, plural N bit word storage unit means, one for each of said programmed start locations, switching circuit means responsive to said start code bit and connected between said decoding means and said plural N bit word storage means to sequentially switch successive N bit word information to the N bit word storage unit means for each programmed start location, and data validation circuit means comprising comparison means connected to said plural N bit word storage unit means and adapted to compare said N bit word information stored therein and gate out for use or display that N bit word which is determined to be true by the selected circuit validity criteria.

5. Improved means for detecting and decoding information on a circularly coded label having a single channel of information arranged in the form of an annular area consisting of a start code bit and N data bits comprising an N bit word, each data bit comprising a pair of alternating contrast areas, comprising moveable sensor means imaging means interposed between said sensor means and said label for imaging said sensor means on said label, means for nutating said sensor means to provide a substantially circular scan of said image upon said single information channel annular area of said label and for relocating said sensor means to a new programmed start location during the time domain of each start code bit thereby to generate plural sequences of frequency modulated phase modulated output signal wavetrains N bits long each representative of said N bit word, decoding and data bit validity checking means connected and responsive to said output signal wavetrain to decode the information therein by conversion to N bit word information, plural N bit word storage unit means one for each of said programmed start locations and each adapted to store the word corresponding to said programmed start location, and data validation circuit means comprising comparison means connected to said plural N bit word storage unit means and adapted to compare said N bit word information stored therein and gate out for use or display that N bit word which is determined to be true by the selected circuit valid-ity criteria.

6. In a method for decoding information on a circularly coded label having a single channel of information arranged in the form of an annular area consisting of a start code bit and N data bits comprising an N bit word, each data bit comprising a pair of alternating contrast areas, the steps of nutating the image of a sensor to effect a circular scan of said image with said single information channel annular area of said label to thereby generate an output signal wavetrain representative of said N data bits separated by said start code bits, each cycle of said output wavetrain being representative of a data bit, and converting the output signal wavetrain to binary word information.

7. In a method for decoding information on a circularly coded label having a single channel of information arranged in the form of an annular area consisting of a start code bit and N data bits comprising an N bit word, each data bit comprising a pair of alternating contrast areas, the steps of moving the image of a sensor to effect a substantially circular scan of said image within said single information channel annular area of said label to thereby generate an output signal wavetrain representative of said N data bits separated by said start code bits, each cycle of said output wavetrain being representative of a data bit, and converting the output signal wavetrain to binary word information.

8. In a method for decoding information on a circularly coded label having a single channel of information arranged in the form of an annular area consisting of a start code bit and N data bits comprising an N bit word, each data bit comprising a pair of alternating contrast areas, the steps of nutating the image of a sensor to effect a circular scan of said image within said single information channel annular area of said label to thereby generate an output signal wavetrain representative of said N data abits separated by said start code bits, each cycle of said wavetrain being representative of a data bit, validating the data comprising said wavetrain for label brightness and contrast area relative angular extent and total number of bits in the label, and converting the output signal wavetrain to binary word information.

9. In a method for decoding information on a circularly coded label having a single channel of information arranged in the form of an annular area consisting of a start code bit and N data bits comprising an N bit word, each data bit comprising a pair of alternating contrast areas, the steps of moving the image of a plurality of sensors to effect a substantially circular scan of said image within said single information channel annular area of said label to thereby generate an output signal wavetrain from each of said sensors that is representative of said N data bit word separated by said start code bits, decoding the output signal wavetrain of each of said sensor means to provide an N bit word pulse-train for each of said sensor means, and validating the N bit word pulsetrains by comparing each of them to each other to satisfy a preselected validity criteria.

10. In a method for decoding information on a circularly coded label having a single channel of information arranged in the form of an annular area consisting of a start code bit and N data bits comprising an N bit word, each data bit comprising a pair of alternating contrast areas, the steps of moving the image of a plurality of sensors to effect a substantially circular scan of said image within said single information channel annular area of said label to thereby generate an output signal wavetrain from each of said sensors that is representative of said N data bit word separated by said start code bits, decoding the output signal wavetrain of each of said sensor means to provide an N bit word pulsetrain for each of said sensor means, validating the N bit word pulsetrains by comparing each of them to each other for identical information content, and selecting for use or display that data which satisfied a preselected validity criteria.

11. In a method for decoding information on a circularly coded label having a single channel of information arranged in the form of an annular area consisting of a start code bit and N data bits comprising an N bit word, each data bit comprising a pair of alternating contrast areas, the steps of moving the image of a plurality of sensors to effect a substantially circular scan of said image within said single information channel annular area of said label to thereby generate an output signal wavetrain from each of said sensors that is representative of said N data bit word separated by said start code bits, decoding and internally validating said output signal wavetrain of each of said sensor means to provide an N bit word pulsetrain, valid for label brightness, contrast area relative angular extent and total number of bits in the label, validating the N bit word pulsetrains by comparing each of them to each other for identical information content, and selecting for use or display that data which is identical in a preselected number of N bit word pulsetrains.

* * * * *